Aug. 22, 1961   F. MITTAG ET AL   2,997,253
DATA SENSING ROUTING CONTROL ARRANGEMENT
Filed Oct. 6, 1958   4 Sheets-Sheet 1

INVENTOR.
F. MITTAG - J. LINDNER
BY

Section A-B

Section C-D

INVENTOR
F. MITTAG - J. LINDNER

United States Patent Office 2,997,253
Patented Aug. 22, 1961

2,997,253
DATA SENSING ROUTING CONTROL
ARRANGEMENT
Fritz Mittag, Berlin-Steglitz, and Jürgen Lindner, Berlin, Germany, assignors to International Standard Electric Corporation, New York, N.Y., a corporation of Delaware
Filed Oct. 6, 1958, Ser. No. 765,558
Claims priority, application Germany Oct. 21, 1957
9 Claims. (Cl. 243—16)

This invention relates to the sensing of destination characteristics applied to carriers in pneumatic tube systems, such characteristics being determinative of the route of the carrier through the system. More particularly, the invention concerns an arrangement for increasing the possible number of routes to be selected by such characteristics while reducing the number of sensing elements required to sense such characteristics.

In the U.S. Patent No. 2,943, issued to F. Mittag-H. Ringhandt, entitled "Data Sensing Arrangement," filed August 1, 1957, an arrangement was disclosed whereby the routes to the destinations of carriers through a pneumatic tube system are set up by the carriers themselves. These carriers are circular in cross-section and, hence, may rotate within the tube. Means must therefore be provided to ensure that the correct destination or route is set up regardless of the angular position of the carrier within the tube. For this purpose, an additional mark or characteristic is utilized and which mark acts as an ambiguity-resolving element. Depending upon the angular position of this additional mark, particular sensing means are employed to read the characteristics of the elements constituting the destination characteristics. In practice, a sensing device acts to operate a changeover element so that the destination characteristics may be correctly evaluated.

The carriers described in said U.S. patent are provided with magnets as marking elements and which magnets are displaceable in tangential directions. Appropriately, these magnets are mounted in rotatable rings which are axially disposed adjacent each other along the carrier. The magnets of any two adjacent rings are poled oppositely. The sensing device comprises magnetically sensitive means disposed around the exterior of the tube and coaxially therewith and in a plane normal thereto. These sensing means are adapted to first respond to the additional mark which is first sensed, and the ambiguity regarding the angular position of the carrier within the tube is resolved. After this resolution a switching function is performed under control of the sensing means which cooperates with said additional mark and, thereafter, the characteristic marks indicative of the destination are sensed in succession as each comes into cooperative position with the sensing means. By virtue of the opposite polarization of the magnet of each ring the sensing means are changed over and are thus enabled to respond to the contrary direction of magnetizations of successive of the magnets associated with said rings. These changeover operations occur successively until the destination marks of the carrier have been scanned in toto.

According to a previous proposal, as contained in German Patent No. 1,003,649, the destination marks may all be arranged in a common plane. In order to initiate a switching control, characteristic of a particular destination, carriers having predetermined fixed characteristics must be used or the magnets on the carriers must be exchangeable and must eventually be reversable with respect to their direction of magnetization. The necessity for exchanging the magnets can be avoided so that the requisite magnetization thereof is not produced until the carrier is to be dispatched. This method is somewhat awkward since it involves the use of special means for changing the magnets or magnetizing them in the proper direction. In the U.S. patent, above mentioned, these difficulties are avoided by providing rings which are rotatable, the rings carrying the magnets. However, there are difficulties which remain with respect to the test or sensing device, namely, difficulties which arise where many destinations are provided for. These additional difficulties reside in the fact that the test or sensing means are many in number and are difficult or even impossible to dispose about the exterior of the tube. The invention eliminates the foregoing disadvantages and raises the number of possible destinations which may be signalled while diminishing the number of angular positions of the rings.

It is an object of the present invention, therefor, to provide an arrangement for destination group control in pneumatic tube systems by applying marking characteristics to the carriers thereof, which carriers are of circular cross-section and hence rotatable about their axes while travelling within the tube and which destination characteristics are magnetic elements displaceable in tangential directions and arranged to cooperate with fixed test or sensing devices situated externally of the tube and wherein an additional characteristic on each carrier serves to ascertain the angular position of the carrier within the tube. It is another object of the invention to provide the destination characteristics by means of magnets which are fixedly mounted in rotatable rings concentric with the carrier axis and actually disposed adjacent each other along the carrier and adapted to be rotated into any one of the angular positions corresponding to a destination position and to provide test or sensing means to cooperate with the markings in one of these positions such as to respond to the magnetic polarity of the sum of all the magnetic polarities peculiar to such markings of all the rings which are situated in an axial line.

A maximum number of possibilities of adjustment will be provided if the number of destination positions is double that of the destination marks of a ring. By providing detents for such positions of the rings, the angular positions of the rings may be sharply defined and thus will prevent the marking characteristics from being intermediate between two test means. Accordingly, where double the number of test means are provided either only one or two of the test means will be affected by the mark. The circuit arrangement of the test means is such that either only each alternate test means shall be effective or two adjacent test means can be affected in parallel by the same mark.

As in the arrangement described in said U.S. patent the fields of the magnetic marks extend radially with respect to the carrier. The two directions of polarization of the marks are so distributed with respect to the rings that each ring possesses a magnetic combination different from those of the other rings. The test means are adapted to respond to none but well-defined polarities.

Thus, in contrast to the arrangement disclosed in said U.S. patent, fewer test means are required to sense markings for a larger number of possible destinations.

The above mentioned and other features and objects of this invention will become apparent by reference to the following description taken in conjunction with the accompanying drawings, in which.

Figure 1:
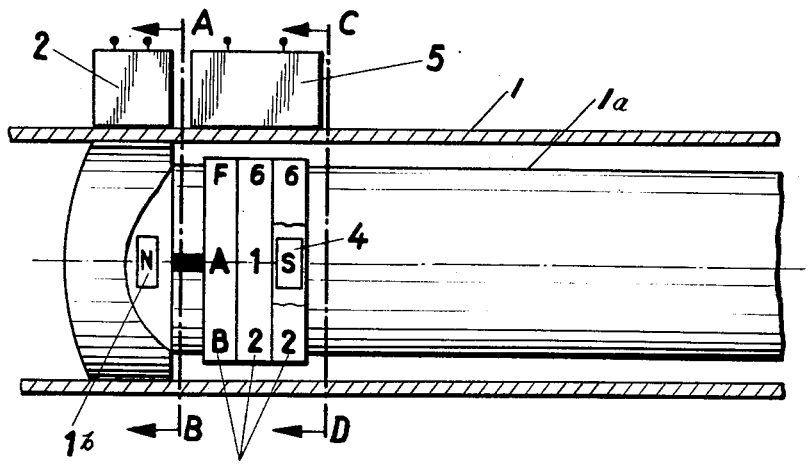
FIG. 1 is a diagrammatic side view partly in section of a dispatch carrier according to the invention having its movable destination marking rings axially disposed adjacent each other together with its ambiguity-resolving marker and the sensing equipment for sensing said rings and said marker.

Referring now to FIG. 1 there is shown diagrammatically a pneumatic tube within which is a portion of a dispatch tube carrier 1a. Fixed within the carrier 1a is a magnet 1b and which magnet is adapted to cooperate with the sensing device 2. The elements 1b and 2 constitute the ambiguity-resolving means in themselves known to the prior art. There is further provided three settable rings 3, which rings are axially disposed adjacent each other on the outside of the body of the carrier 1a. Each of these rings contains a magnet 4 and each of the magnets 4 cooperate with the test device 5. In the example shown, each ring has six stop positions so that the carrier is adjustable for 6×6×6=216 possible destinations. The leftmost ring 3 is marked with the letters A–F, whereas the other two rings are marked with numerals 1–6.

Figure 2:
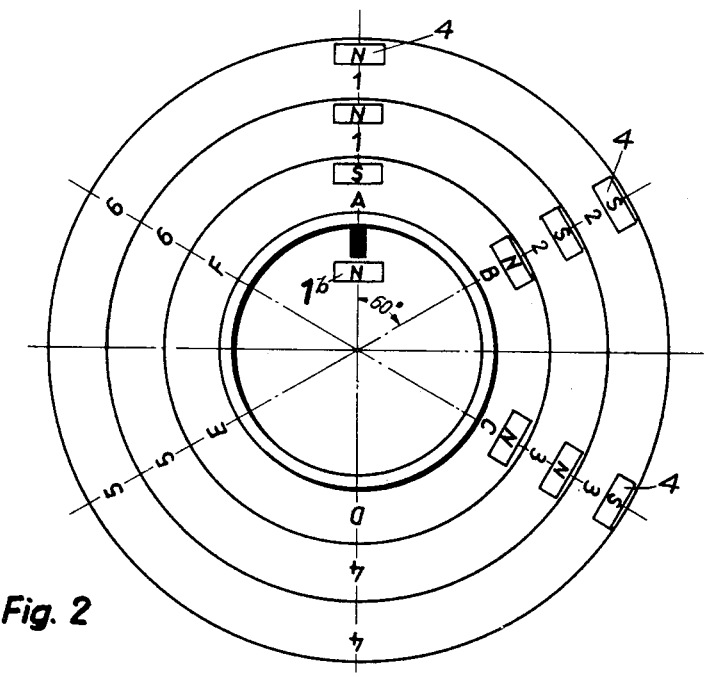
FIG. 2 is a distorted end view of FIG. 1 with each marking ring being shown as having a different radius.
Figure 3:
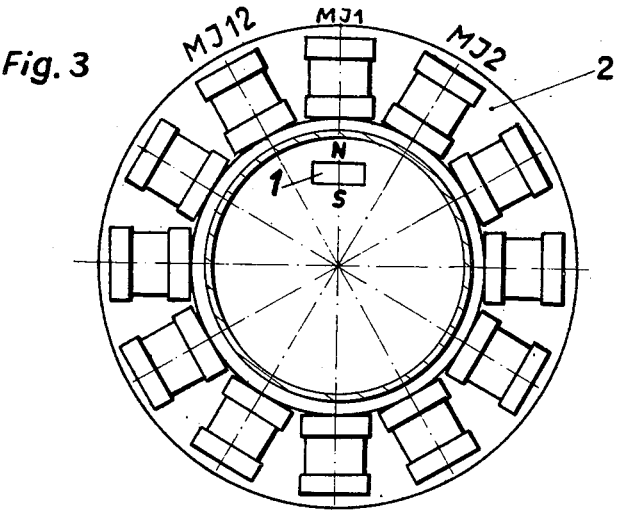
FIG. 3 represents a section taken along the line A—B in FIG. 1.
Figure 4:
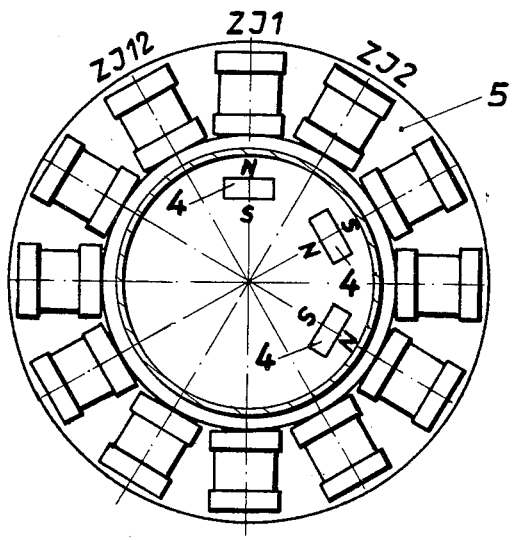
FIG. 4 represents a section taken along the line C—D in FIG. 1.

In FIG. 2, which is a distorted end view of FIG. 1, each of the rings 3 is shown as having a different radius, so that each of the magnets 4 may be seen. As will be seen in FIG. 2, each ring 3 contains three magnets 4 polarized in different combinations so that the outer ring 3 contains the magnets in a north, south, south combination; the intermediate ring contains the combination north, south, north, and the inner ring contains the combination south, north, north. Thus, there are half as many magnets as there are stop positions, which number 6, as above explained. As stated before, the rings are rotatable with respect to each other. If the rings are set so that only one magnet pole is in the axial or marking line determined by the magnet 1, then this pole alone will be decisive of the test result. If one or more north poles, and as many south poles are situated in that line, their fields annul each other so that the marking value is zero, and the test device would not be excited. If, however, the north poles and south poles in the marking line are unequal in number, the test device will be affected by the preponderating polarity. A characteristic scanning operation will now be traced with the aid of FIGS. 1, 3 and 4. As soon as a carrier reaches the test position at which it is momentarily stopped, the test means 2 cooperate with the magnet 1b and the angular position of the carrier within the tube is determined thereby. The test means 2 is shown in more detail in FIG. 3 and consists of a plurality of inductances MJ1 . . . JM12, having their axes radially disposed about the exterior of the tube 1. The magnet 1b will affect either one or two neighboring test means depending upon its angular position. As shown in FIG. 3, the magnet 1b will affect the test means MJ1 because it is in alignment with the axis of the test means MJ1. If, however, the magnet 1b were positioned between the radial lines defining the axes of the sensing means MJ1, MJ2, both sensing means would be activated. Let us assume, however, that only one of the sensing elements is activated. Thereby, a changeover operation is initiated such that two neighboring sensing means ZJ1 . . . ZJ12, shown in FIG. 4 and constituting the elements of the sensing means shown as 5 in FIG. 1, are connected in parallel. Alternatively, if two of the test means shown in FIG. 3 are excited, then two alternate of the test means shown in FIG. 4 are connected in parallel. It will be understood that the test means shown in FIGS. 3 and 4 are mounted around the transmission tube 1 and in two vertical planes. The test means 2 and 5 of FIG. 1 are spaced apart a distance equal to the distance which separates the magnet 1b from the rings 3 on the carrier, as shown in FIG. 1.

The rings 3 being individually rotatable, may be turned so that each stop position results in a different polarity sum. For example, if the rings of a carrier have been set for a destination corresponding to the code A11, the values pertaining to the stop positions of the rings 3 will be those set forth in the following table, and which table also tabulates the values characteristic of the destinations A12, A13 and F66:

| Destination | | 1 | 2 | 3 | 4 | 5 | 6 |
|---|---|---|---|---|---|---|---|
| 111 | (A11) | N | S | N | O | O | O |
| 112 | (A12) | S | S | N | O | O | N |
| 113 | (A13) | S | O | N | O | N | S |
| * | * | * | * | * | * | * | * |
| 666 | (F66) | O | N | S | N | O | O |

As will be understood from the foregoing, two sets of test means, namely, the circular rows MJ1 . . . MJ12, and ZJ1 . . . ZJ12, are arranged to sense the destination marks of a carrier arriving at the scanning position, as shown in FIG. 1. The test means ZJ1 . . . ZJ12 act to scan one polarity first, and then after a changeover action has occurred, act to scan the other polarity.

In the case of destination A11 the scanning of the north-pole evaluation results in the following particulars:

N–O–N–O–O–O; after changing-over:
O–S–O–O–O–O; the sum thereof is
N–S–N–O–O–O.

In these enumerations of pole value, as well as in the others not contemplated here more fully, the combinations of any two of the designations N, S, O may be expressed in coding fashion by any desired sign such as a numeral, so that, for example,

N–N=1    S–S=4    O–O=7
N–S=2    S–N=5    O–N=8
N–O=3    S–O=6    O–S=9

The enumeration N–S–N–O–O–O, respecting the destination A11, can thus be expressed by the number 237 because N–S=2, N–O=3, O–O=7. Accordingly, 237 is the electrical code number that corresponds to the destination A11.

Figure 5A:
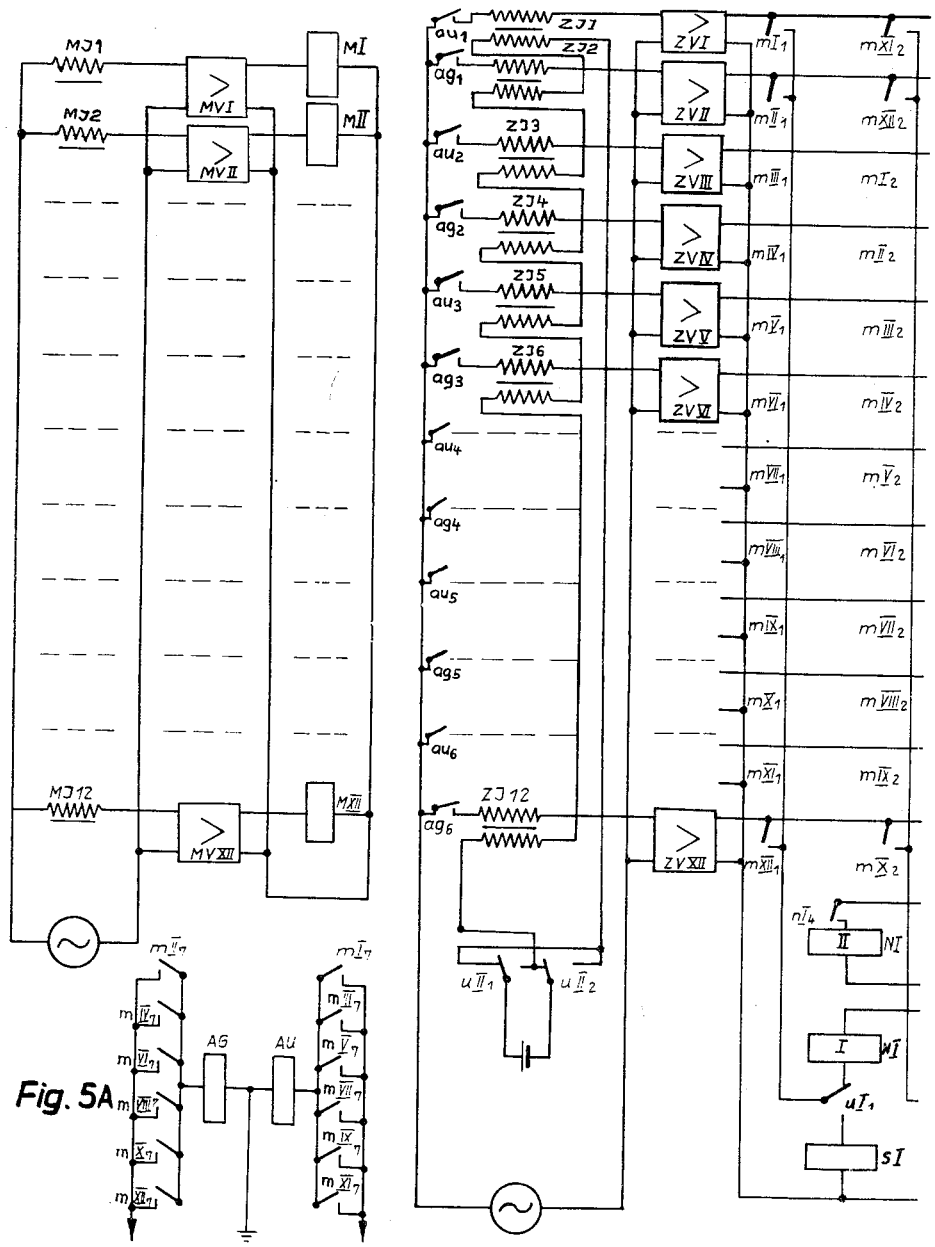
FIGS. 5A and 5B show a diagram of the circuit controlled by the sensing equipment of FIG. 1.
Figure 5B:
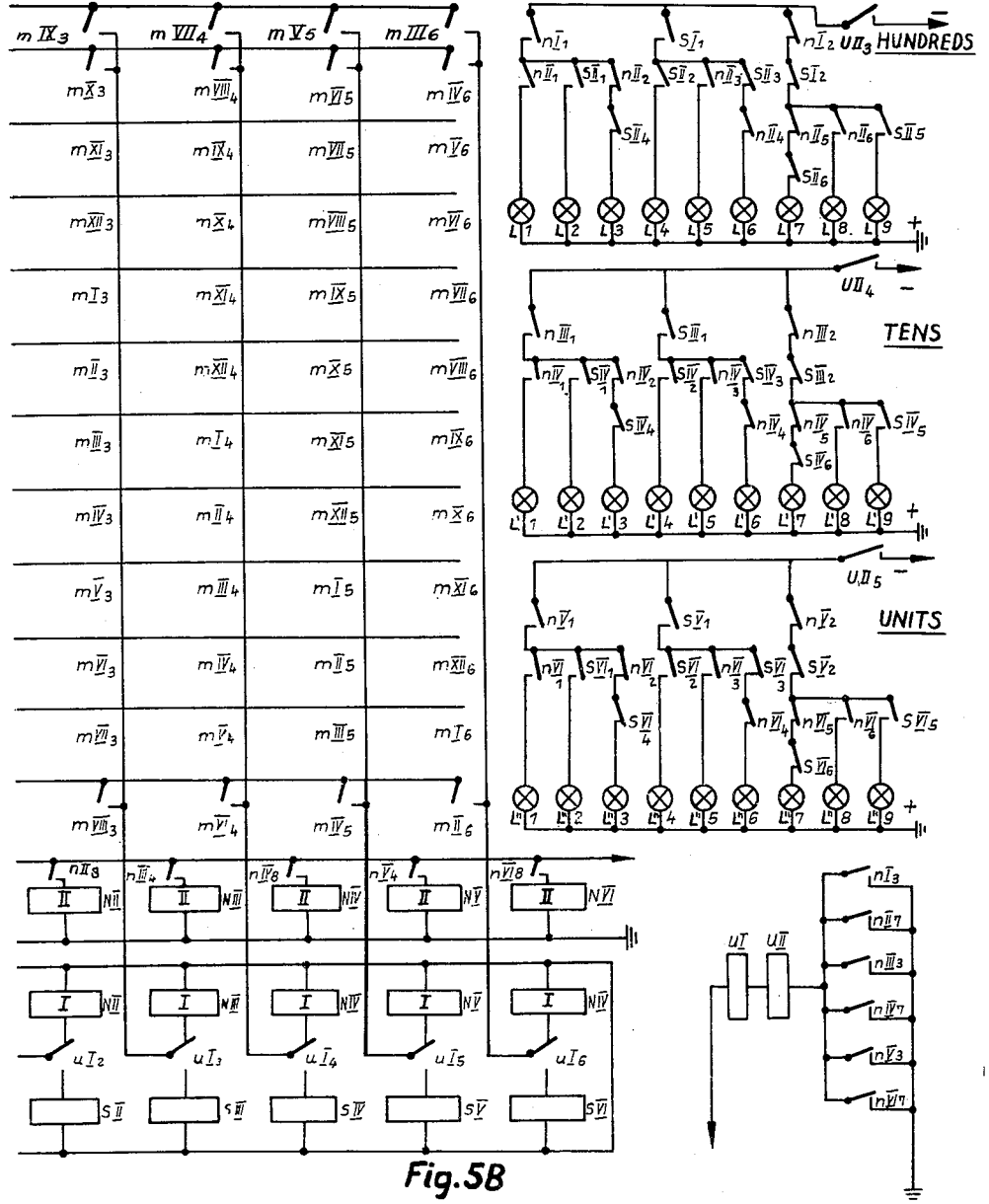

The mode of operation of this arrangement will be described hereafter with reference to FIG. 5. The destinations here contemplated is again A11, that is, the electrical code number 237 or N–S, N–O, O–O, as just stated.

The chokes MJ1 . . . MJ12 each have one terminal connected to one terminal of an alternating current source S1 and their other terminals connected to relays MI . . . MXII, through individual amplifiers MVI . . . MVXII, respectively. By decreasing the inductance of a choke, its associated relay will be caused to operate. The chokes ZJ1 . . . ZJ12 are provided with direct current biasing windings normally energized in one direction by a battery B over transfer contacts uII1, uII2. It will be seen that when the contacts uII1 and uII2 transfer, that the direction of magnetization of the chokes ZJ1 . . . ZJ12 is reversed.

The carrier, whose rings 3 have been so set as to represent the destination mark A11, arrives in the scanning position shown in FIG. 1. Accordingly, magnet 1 is then in the position represented in FIG. 3 and thus affects the test means MJ1. The inductance of choke MJ1 is altered and causes relay MI to energize over amplifier MV1. Contact m17 of relay MI hence closes to complete the circuit of relay AU which by means of its contacts au1, au2 . . . au6 seizes the odd-numbered test means ZJ1, ZJ3, ZJ5 . . . ZJ11. The contacts mI1, mI2 . . . mI6 of MI prepare the circuits of relays NI . . . NVI and SI . . . SVI. The test means ZJ1 . . . ZJ11 comprise premagnetization devices so connected that these test means respond to north-magnetic influence. In the position of the magnets 4 as shown in FIG. 4, it is the test means ZJ1 and ZJ5 which are affected by the north poles N whereby the following circuits become effective:

Amplifier ZVI, contact mI1, contact uI1, winding I of relay NI, and back via lead L to ZVI; and Amplifier ZVV, contact mI3, contact uI3, winding I of relay NIII, and back to ZVV via lead L.

The relays NI, NIII hence energize and hold themselves over their contacts nI4 and nIII4, and their winding II, respectively. Contacts nI3, nIII3 cause the relays UI, UII to respond. By the contacts uII1, uII2 of UII the polarity of the premagnetization circuit of the test means ZJ1, ZJ3 . . . ZJ11 is reversed so that now these test means are sensitive to magnetic south poles. By the contacts uI1, uI2 . . . uI6 of relay UI, the relays SI . . . SVI are coupled to the amplifiers ZVI . . . ZvXII dependent upon which of the M relays is operated. In the condition shown in FIG. 4 it is the test means ZJ3 which is affected by a south pole, so the following circuit becomes effective:

Amplifier ZVIII, contact mI2, contact uI2, relay SII, and back to ZVIII.

Relay SI therefore energizes. The relays NI, NIII, SII, having been energized, constitute with certain of their contacts the electrical code number 237, that corresponds to the destination A11. The code number is here displayed by lamps L1 . . . L9, L'1 . . . L'9, and L″ . . . L″9 control devices necessary in dispatch tube systems. The circuits of these lamps are prepared by the contacts uII3, uII4, uII5 of relay U1, this having been energized as stated. The relays NI, NII, SI, SII control the hundreds lamps L1 . . . L9, the relays NIII, NIV, SIII, SIV the tens lamps L'1 . . . L'9 and the relays NV, NVI, SV, SVI the units lamps L″1 . . . L″9 corresponding to any code number. Since in the example here contemplated it is the relays NI, NIII, SII that have been operated, the resultant circuits are:

(1) (Hundreds): +, lamp L2, contacts sII1, nI1, uII3, —;
(2) (Tens): +, lamp L'3, contacts sIV4, nIV2, nIII1, uII4, —;
(3) (Units): +, lamp L″7, contacts sVI6, nVI5, sV2, nV2, uII5, —.

Control in respect of the electrical code number 237 has thus been performed. Similarly with the provision of adequate control devices the route to the destination will be set up by the carrier itself.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A data sensing and routing control arrangement for determining a path for a dispatch carrier in a conveying system comprising in combination a fixed magnetic index disposed on said carrier, a plurality of mounting rings fixed longitudinally with respect to said carrier and concentric with the longitudinal axis thereof, said mounting rings being independently rotatable with respect to said carrier and each other, each of said rings having a plurality of magnetic elements secured in spaced relation on the periphery of said rings, said magnetic elements each having a radially directed magnetic field of a preselected polarity to give each mounting ring a different polarity combination of magnetic elements, a first group of magnetic sensing means radially located about the conveying system path, and adapted to sense the angular position of said index with respect to said path, a second group of magnetic sensing means radially located about the conveying path and longitudinally displaced from said first group, said second group adapted to sense the preponderant polarity of each group of polarities formed by adjacent magnetic elements of different rings and lying in a line parallel to the carrier axis, control means associated with said first and second groups of sensing means for determining a path for said carrier in accordance with the preponderant polarities sensed by the said second group of sensing means and by the angular position of the said index as sensed by the said first group of sensing means, and switching means controlled by the said control means for establishing the said determined path.

2. A data sensing and routing control arrangement as claimed in claim 1, wherein both said first and said second sensing means comprises a plurality of separate magnetic polarity detecting elements disposed about said tube in different angular positions, respectively.

3. A data sensing and routing control arrangement as claimed in claim 1, wherein said first magnetic element is spaced from said other magnetic elements a distance equal to the space between said first and second sensing means.

4. A data sensing and routing control arrangement as claimed in claim 1, wherein each of said magnetic elements comprise a permanent magnet having a magnetic field which extends radially with respect to said carrier, said magnets poled so that each possible combination of sums of magnetic polarity along a line parallel to the axis of said carrier at any angular position is different from that at any other angular position.

5. A data sensing and routing control arrangement as claimed in claim 1, wherein each of the polarity detecting elements comprising said second sensing means consists of a pre-magnetization winding and a sensing winding wound about a common core.

6. A data sensing and routing control arrangement as claimed in claim 5, further comprising a source of premagnetizing potential, switch means for selectively reversing the direction of flow of said potential through said pre-magnetizing windings, said switch means under control of said first sensing means.

7. A data sensing and routing control arrangement as claimed in claim 6, wherein the pre-magnetizing windings of adjacent of said detecting elements are coupled to said source in opposite directions.

8. A data sensing and routing control arrangement as claimed in claim 7, further comprising switch means for reversing the direction of coupling of each of said detecting elements to said source under control of said first sensing means.

9. A data sensing and routing control arrangement as claimed in claim 7, further comprising two groups of switch means, selected ones of a first of said groups adapted to operate in response to the sums of detected magnetic polarities while said premagnetizing windings are energized by said source in a first direction and selected other switch means of said other group adapted to operate in response to the sums of detected magnetic polarities while said pre-magnetizing windings are energized by said source in the opposite direction.

References Cited in the file of this patent

UNITED STATES PATENTS

| 1,983,342 | Chambers | Dec. 4, 1934 |
| 2,877,718 | Mittag | Mar. 17, 1959 |
| 2,943,814 | Mittag et al. | July 5, 1960 |

FOREIGN PATENTS

| 603,042 | Germany | Sept. 21, 1934 |